July 7, 1970 W. T. COMMONS 3,519,097
INDUSTRIAL VEHICLE WITH SINGLE DIRIGIBLE WHEEL
Filed March 14, 1968
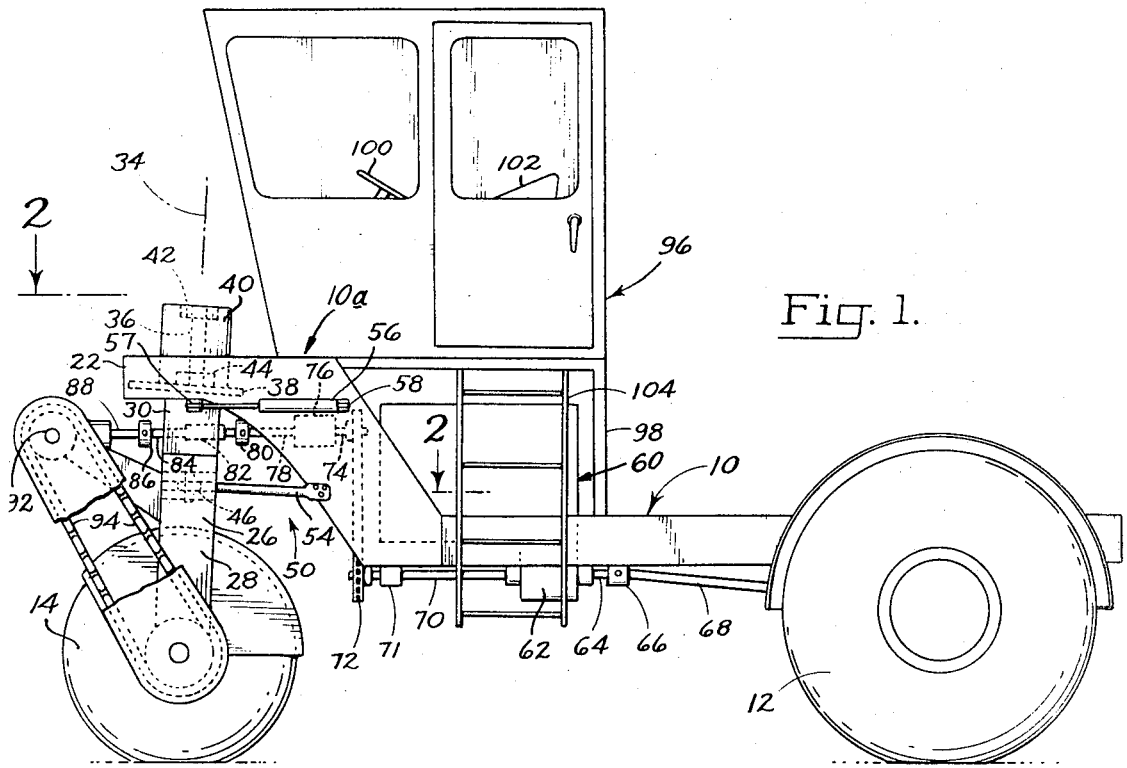
Fig. 1.
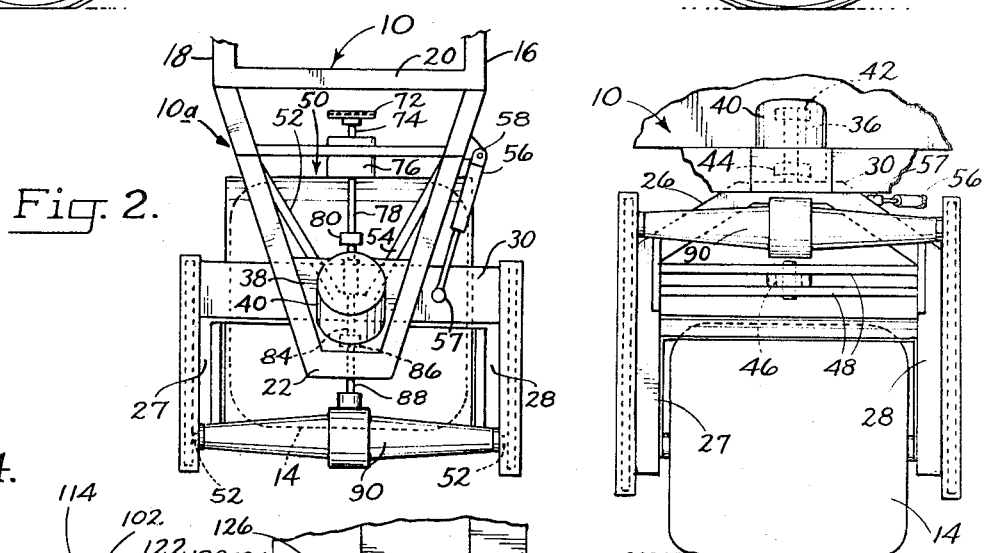
Fig. 2.
Fig. 3.
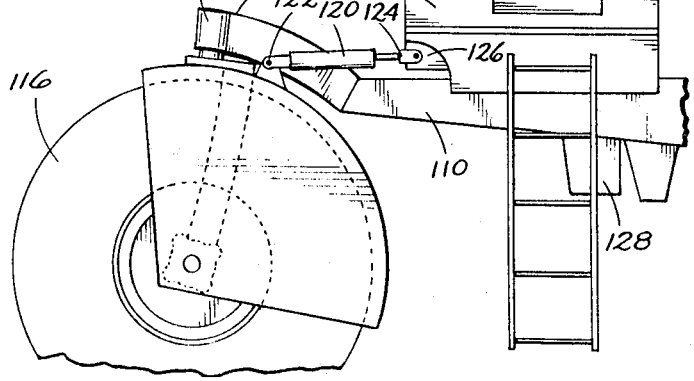
Fig. 4.
Ward T. Commons
INVENTOR
BY
Kolisch & Hartwell
Attys.

United States Patent Office 3,519,097
Patented July 7, 1970

3,519,097
INDUSTRIAL VEHICLE WITH SINGLE
DIRIGIBLE WHEEL
Ward T. Commons, Rte. 2, Box 111,
Scio, Oreg. 97374
Continuation-in-part of application Ser. No. 510,205,
Nov. 29, 1965. This application Mar. 14, 1968, Ser.
No. 713,152
Int. Cl. B62d 61/08
U.S. Cl. 180—26    4 Claims

ABSTRACT OF THE DISCLOSURE

An industrial vehicle with single dirigible wheel at one end supported underneath the forward extremity of a frame, where such frame comprises a pair of elongated longitudinals extending in laterally spaced relation a substantial part of the vehicle's length. Such longitudinals at the forward end of the vehicle form a tongue by arching upwardly and forwardly while converging upon each other. The dirigible wheel is mounted on a forked wheel bracket which swivels relative to the tongue through a kingpin located on top of the tongue. A frame extension projecting forwardly from the tongue is joined through a bearing assembly to a portion of the wheel bracket spaced below the kingpin. Steering is performed under power by a fluid-operated jack journaled at one end on the wheel bracket and projecting rearwardly past the tongue to an opposite end journaled at a stationary location relative to the vehicle frame. A cab for housing a vehicle operator has its base supported at its forward end on the tongue, and such cab extends rearwardly on the vehicle while in a position overlying an engine supplying power for propelling the vehicle.

---

This application is a continuation-in-part of prior-filed application Ser. No. 510,205, entitled "Tricycle Swamp Buggy," filed Nov. 29, 1965, now Pat. 3,403,745.

This invention relates to an industrial vehicle, and more particularly, to such a vehicle which is supported for movement by three wheels and includes a single dirigible wheel at one end for steering the vehicle.

A three-wheeled vehicle of the type contemplated has distinct advantages in operations requiring movement over rough terrain. By incorporating but one wheel to support one end of the vehicle, all wheels are assured of ground contact at all times. With pneumatic tires of substantial size included in the various wheels, a substantial flotation characteristic is obtained, enabling the vehicle to operate in soft and muddy ground where ordinary vehicles become mired. This invention generally contemplates improvements in vehicles of a three-wheeled class, which make the vehicle easy to maneuver and otherwise operate, and contribute to a low profile whereby better balancing characteristics and visibility are obtained. The vehicle features a novel mounting for the dirigible wheel at one end, contributing to a compact construction, with such construction having sufficient strength and rigidity to prevent undesired vibrations and inhibit twisting in the frame during vehicle travel.

One general object of the invention is to provide an industrial vehicle of the type described, featuring a frame comprising a pair of elongated frame longitudinals extending in laterally spaced relation over a substantial part of the vehicle's length, such frame at one end including a tongue of reduced lateral dimension that inclines upwardly and extends forwardly to an elevated extremity disposed at substantially the midline of the vehicle. This elevated extremity is utilized in mounting the dirigible wheel, and the remainder of the longitudinals, which are at a lower elevation, may be utilized in supporting a load in relatively close proximity to the ground. The upwardly arching tongue provides suitable clearance for the dirigible wheel which swivels under it, while retaining a low profile in the vehicle.

A further object is to provide such a vehicle, wherein the engine for providing the power for propelling the vehicle is located immediately adjacent the upwardly arching tongue described, but rearwardly of such tongue. A cab, for housing the vehicle operator, is supported over such engine and includes a base that at its forward end may be supported on the tongue. In this way the tongue is employed to elevate the cab over the engine with any operator in the cab provided good visibility by reason of his elevated position.

In a vehicle including a single dirigible wheel supporting one end, substantial stressing of the frame and mounting for the dirigible wheel results on movement over the ground. A problem, therefore, is presented in suitably mounting the dirigible wheel whereby it may swivel about an upright axis, without the mounting being so massive as to unduly weight the vehicle or obscure vision. A particular feature and object of the invention is the provision of a novel frame extension which is employed to mount the dirigible wheel, which braces the parts while permitting proper swivel movement in the dirigible wheel.

As further contemplated by this invention, the wheel is steered by means of a fluid-operated jack interposed between a forked wheel bracket which mounts the dirigible wheel on the frame, and a point anchored relative to the frame proper. This jack extends rearwardly from the wheel bracket, past the tongue of the frame where it inclines upwardly. Since the lateral dimension of the tongue portion is substantially less than the frame at the opposite end of the frame, this locates the jack well inwardly of the side of the vehicle. With the organization, a wide swing axis in the dirigible wheel is retained.

In a specific and preferred embodiment of the invention, the forked wheel bracket which mounts the dirigible wheel is swiveled through a kingpin and multiple bearing assemblies disposed on top of the tongue in the vehicle frame. A frame extension joined to the tongue and connected through a bearing assembly with cross brace structure located downwardly on the wheel bracket from the kingpin provides additional swivel support for the wheel bracket. Drive from the engine to the front wheel may be made by a shaft means extending through the wheel bracket in a space provided between the kingpin and the cross brace structure. The organization permits reduced mass in the kingpin, while retaining proper strength, and maximizes the visibility obtained over the dirigible wheel by the operator of the vehicle.

These and other objects and advantages are attained by the invention, and the same is described hereinbelow in conjunction with the accompanying drawings, wherein:

FIG. 1 is a side elevation of an industrial vehicle according to an embodiment of the invention, including at the forward end thereof a single dirigible wheel employed in steering the vehicle;

FIG. 2 is a view taken along the line 2—2 in FIG. 1 illustrating in plan a tongue at the forward extremity of the frame, and illustrating further details of the dirigible wheel;

FIG. 3 is a front elevation of the dirigible wheel shown in FIGS. 1 and 2; and

FIG. 4 is a side elevation of a vehicle constructed according to another modification of the invention.

Referring now to the drawings, and first of all more particularly to FIGS. 1, 2 and 3, the industrial vehicle illustrated comprises a vehicle frame 10 supported at its rear end by opposed lateral support wheels, such as the wheel shown at 12, and at its forward end by a single dirigible wheel, indicated at 14.

Frame 10 is formed of two elongated frame longitudinals, indicated at 16, 18, suitably interbraced as by cross members such as the cross member 20 shown. Progressing from the rear end of the vehicle (the right end in FIG. 1) forwardly toward the location of cross member 20, the frame members are substantially parallel and laterally spaced from each other, with one forming one side and the other forming the opposite side of an elongated, substantially horizontal deck. Progressing forwardly from cross member 20 the frame members converge on each other, and incline upwardly and extend forwardly, to form a tongue, designated generally at 10a. The forward extremity 22 of the tongue thus is elevated with respect to the rear of the frame, and is located at substantially the midline of the vehicle.

To permit the vehicle best to travel over soft ground, the various vehicle wheels are provided with wide tread pneumatic tires as shown, giving a high degree of flotation to the wheels. Rear wheels 12 are disposed laterally outwardly of the frame longitudinals, and are mounted on suitable axle structure (not shown) carried at the rear vehicle frame. The front dirigible wheel preferably has a somewhat smaller circumference than the rear wheels, which contributes to lowering of the side profile of the vehicle at the front. With the dirigible wheel located under the tongue, and substantially at the midline of the vehicle, and the rear wheels laterally outwardly of the frame members, the front and rear wheels do not track. In fact, the front wheel travels over terrain which is for the most part, disposed between that covered by the rear wheels.

Considering in more detail the mounting of the dirigible wheel, shown at 26 is a forked wheel mounting bracket including opposed downwardly depending arms 27, 28, and joining the arms adjacent their top an arched cap 30. An axle suitably journaled in the lower extremities of arms 27, 28 mounts the wheel for rotation within the wheel mounting bracket.

The wheel mounting bracket is mounted for swivel movement about an upright axis which is inclined slightly from a true vertical to promote ease of steering. The swivel axis for the wheel bracket is indicated in FIG. 1 generally by the dotdash line 34.

Considering further the swivel mounting for the wheel bracket, a kingpin 36 joined to and projecting upwardly from cap 30 extends through a plate 38 secured in the forward extremity of tongue 10a and into a bearing housing 40 fastened to the top of this plate. Spaced bearing assemblies, shown generally at 42, 44 mount the kingpin at points spaced along its length, with the kingpin rotatable about swivel axis 34.

It will be observed that with a single dirigible wheel, and when traveling over irregular terrain, considerable stresses can develop in the forward portion of the vehicle. To add stability to the swivel mounting for the front wheel, and to enable a reduction in the mass of the kingpin and its mounting, it is contemplated that the swivel mounting for the wheel bracket further include another bearing assembly, shown at 46, spaced below the cap in the wheel bracket. This bearing assembly is mounted in cross brace structure 48 which extends between and joins the arms of the wheel bracket below cap 30. Bearing assembly 46 journals for relative rotation the forward end of what is referred to herein as a frame extension 50, with such relative rotation being about swivel axis 34.

Frame extension 50 comprises a pair of bars 52, 54 which are joined at their rear ends to opposite sides of the vehicle frame, more specifically the tongue of the frame. The bars converge on each other and are joined at the location of bearing assembly 46.

The dirigible wheel is steered under power by means of a fluid-operated jack shown at 56. The forward end of this jack is journalled on the wheel bracket, more specifically arched cap 30 of the bracket, at 57. Journal 57 is spaced laterally of the swivel axis for the wheel bracket. Progressing from this connection with the wheel bracket, the jack extends rearwardly past the upwardly inclining tongue of the frame, to a journal connection 58 made with the frame of the vehicle. With the tongue of the frame having a reduced lateral dimension, and because of the incline of the tongue, the jack may be placed close to the tongue and well inwardly of the side of the vehicle, as best illustrated in FIG. 2, and still be effective to exert proper torque on the dirigible wheel for steering purposes, over a wide swing axis for the dirigible wheel.

An engine used in propelling the vehicle over the ground is shown generally at 60. The engine is located immediately adjacent the rear of the upwardly inclining tongue in the frame, and suitably supported on the frame longitudinals where they extend rearwardly in parallel spaced-apart relation. The usual engine drive shaft (not shown) connects with a transmission 62, and from this transmission drive to the rear wheels is through shaft 64, universal 66, and shaft 68 to the usual rear wheel differential.

To provide maximum versatility in the vehicle, it is desirable to provide drive to the front dirigible wheel as well as to the rear wheels. Toward this end, a shaft 70 extends forwardly from transmission 62 and through a bearing 71, such shaft being connected through a chain and sprocket assembly 72 to a shaft located substantially at the midline of the vehicle and between the frame longitudinals. From shaft 74, the drive is through an overrunning clutch 76, shaft 78, universal 80, a telescopic spline connection 82, shaft 84, universal 86, to input shaft 88 of a differential mechanism 90, suitably mounted on the forked wheel bracket. Differential mechanism 90 is located forwardly of the wheel bracket and somewhat below the level of the tongue at the latter's forward extremity.

Drive is transmitted out from the ends of the differential mechanism through differential shafts 92, and chain and sprocket assemblies, such as the one shown at 94, connect the differential shaft at each end of the differential mechanism to the axle which supports dirigible wheel 14.

As earlier discussed, it is important that the vehicle have a relatively low side profile, whereby the center of gravity of the vehicle is lowered and maneuvering is generally made easier. Contributing to this low side profile is the kingpin and bearing organization discussed, including bearing 46 affording relative swiveling of frame extension 50 and cross brace structure 48 carried by the forked wheel bracket. It will be noted, and with particular reference to FIG. 3, that a space is provided between the cross brace structure and arched cap 30 in the wheel bracket. This space is utilized in the supply of driving power to differential mechanism 90, as it will be noted that the drive shaft means including shaft 84 connecting the differential mechanism with overrunning clutch 76 extends through this space.

The purpose of including the overrunning clutch is to enable the front wheel drive to become operative automatically when the rear wheels begin to slip. The various drive mechanism components are so selected that when the circumference of front dirigible wheel 14 is turning at the same peripheral speed as the circumference of the two rear wheels, shaft 84 will be turned by rotation of the front wheel at a speed just slightly greater than the speed at which shaft 74 is driven by transmission 62. With these conditions, the clutch 76 allows shaft 84 to overrun shaft 74. However, as soon as the rear wheels begin to slip, the speed at which shaft 74 is driven increases and with sufficient slippage the shaft becomes positively connected to shaft 84 through the action of the overrunning clutch.

Shown at 96 is an operator's cab which is supported on the frame of the vehicle with the base of the cab at its forward extremity resting on the elevated tongue of the frame and the rear of the cab supported through strut structure 98 on the deck section of the frame. The cab is in a position overlying the engine and associated parts, to leave much of the deck section of the frame unobstructed (whereby it may be utilized to carry loads) and to place the operator of the vehicle in a position where optimum visibility is afforded on the ground over which the vehicle travels. Within the vehicle are the usual controls, including steering wheel 100. Shown at 102 is a seat for the operator. Ladder 104 extends up the side of the vehicle to provide easy access to the cab.

As illustrated in FIG. 4, the forward part of the vehicle is shown constructed according to a modified form of the invention. Here, the frame 110 of the vehicle terminates at its forward end in an arcuately curved tongue 112. Such tongue supports, through a swivel mounting 114, a dirigible wheel 116. Steering jack 120 is mounted at 122 on the bracket structure which supports the dirigible wheel, and has its other end anchored at 124 to a bar 126 joined to the vehicle frame. The cab for the vehicle in this instance is shown at 126, and such overlies the engine for driving the vehicle partially shown at 128.

It will be seen from the above that the vehicle contemplated possesses a number of novel features contributing to a low profile, good visibility of the terrain being traveled by the vehicle, and proper rigidity, especially in forward portions of the vehicle where twisting and vibrations could be a problem. Steering is performed effectively with a fluid-operated jack so positioned as to afford a good swing axis in the dirigible wheel, while still being located well inwardly on the side of the vehicle. Where drive is transmitted from the engine to the dirigible wheel, as in the modification of the invention shown in FIGS. 1, 2, and 3, such is done in a manner which does not interfere with low profile desired in the front of the vehicle, and does not obstruct in any way the vision of the vehicle operator. The organization also frees a considerable region above the deck section of the frame for mounting a load or for other vehicle uses.

While modifications of the invention have been described, it is appreciated that variations and changes are possible without departing from the invention. It is desirable to cover all such modifications and variations as would be apparent to one skilled in the art, and that come within the scope of the appended claims.

It is claimed and desired to secure by Letters Patent:
1. In an industrial vehicle,
  a frame comprising a pair of elongated frame longitudinals extending substantially horizontally in laterally spaced relation a substantial part of the vehicle's length, said frame at one end of the vehicle including a tongue of reduced lateral dimension that inclines upwardly and extends forwardly to an elevated extremity disposed at substantially the midline of the vehicle,
  a single dirigible wheel supporting said one end of the vehicle located beneath said elevated extremity of said tongue, and a pair of opposed wheel assemblies laterally outside of the longitudinals supporting the opposite end of the vehicle,
  a forked wheel bracket with arms straddling the dirigible wheel that journals the dirigible wheel and having an upper part swiveled on the elevated extremity of said tongue for swiveling about an upright axis, and
  at least one fluid-operated steering jack with a forward end journaled on said wheel bracket at a point located laterally of said tongue, said jack extending rearwardly from said wheel bracket past said tongue while in laterally outward spaced relation to the tongue where it inclines upwardly and having a rear end journaled at a location which is fixed relative to the vehicle frame.
2. The vehicle of claim 1, wherein said wheel bracket includes cross brace structure interconnecting said arms and spaced below said upper part, a frame extension is joined to said vehicle frame and extends forwardly to adjacent said cross brace structure, a bearing assembly interconnects said cross brace structure and frame extension, and said fluid-operated steering jack has its forward end journaled on said wheel bracket at a location intermediate said bearing assembly and where said upper part is swiveled on said tongue.
3. In an industrial vehicle,
  a vehicle frame comprising a pair of elongated frame longitudinals extending substantially horizontally in laterally spaced relation a substantial part of the vehicle's length, said frame at the forward end of the vehicle including a tongue of reduced lateral dimension that inclines upwardly and extends forwardly to an elevated forward extremity disposed at substantially the midline of the vehicle,
  a single dirigible wheel supporting said forward end of the vehicle located beneath the elevated extremity of said tongue and a pair of opposed wheel assemblies laterally outside of the longitudinals supporting the rear end of the vehicle,
  a forked wheel bracket with arms straddling the single dirigible wheel that journals the dirigible wheel and having an upper part swiveled on the elevated extremity of said tongue for swiveling about an upright axis,
  an engine operable to propel the vehicle supported on said frame immediately adjacent said tongue but toward the vehicle's rear end from the tongue, and
  an operator's cab disposed over said engine with a base supported at its forward extremity on an elevated part of said tongue.
4. In an industrial vehicle,
  a vehicle frame comprising a pair of elongated frame longitudinals having rear expanses extending at the rear of the vehicle substantially horizontally and in laterally spaced relation, said frame at the forward end of the vehicle including a tongue of reduced lateral dimension that inclines upwardly and extends forwardly to an elevated forward extremity disposed substantially at the midline of the vehicle,
  a pair of opposed power driven rear wheels supporting the rear end of the vehicle, said rear wheels carrying the frame with said rear expanses below the tops of the wheels and said longitudinals being laterally inwardly of the wheels to provide clearance for the wheels,
  a single dirigible wheel supporting said forward end of the vehicle located beneath the elevated extremity of said tongue, a forked wheel bracket with arms straddling the dirigible wheel that journals the wheel and having an upper part swiveled on the elevated extremity of the tongue for swiveling about an upright axis,
  an engine for propelling the vehicle supported on said frame adjacent said tongue but toward the vehicle's rear end from said tongue, power transmitting means connecting said engine and said rear wheels extending from the engine rearwardly beneath the top of said longitudinals, and an operator's cab located adjacent said tongue but rearwardly of said tongue including means for seating an operator with such operator elevated above said engine and said wheel bracket which journals said dirigible wheel, said rear expanses of said frame longitudinals extending rearwardly of the engine and cab and providing a deck for supporting a load.

References Cited

UNITED STATES PATENTS

| | | | |
|---|---|---|---|
| 1,279,556 | 9/1918 | Kulma | 180—26 |
| 1,511,873 | 10/1924 | Davison | 180—26 |
| 2,362,453 | 11/1944 | Cosper | 180—89 X |
| 2,534,506 | 12/1950 | Essick | 180—20 |
| 2,557,339 | 6/1951 | Campbell | 296—28 |
| 2,930,439 | 3/1960 | Alig et al. | 180—20 X |
| 2,954,088 | 9/1960 | Williamson et al. | 180—20 |
| 3,006,427 | 10/1961 | Lely | 180—27 |
| 3,101,806 | 8/1963 | Salna | 180—52 |
| 3,268,025 | 8/1966 | Fehn | 180—31 |

KENNETH H. BETTS, Primary Examiner

U.S. Cl. X.R.

180—89